United States Patent [19]

Hill

[11] Patent Number: 5,527,461
[45] Date of Patent: Jun. 18, 1996

[54] AIRLIFT OIL SCAVENGER

[76] Inventor: Gordon A. Hill, 243 Whitecap Crescent, Saskatoon, Saskatchewan, Canada, S7M 5C6

[21] Appl. No.: 253,172

[22] Filed: Jun. 2, 1994

[51] Int. Cl.⁶ .................. E02B 15/04; B01D 17/032; B01D 17/028
[52] U.S. Cl. .................. 210/220.000; 210/242.2; 210/242.3; 210/538; 210/540; 210/923; 210/776
[58] Field of Search .................. 210/242.2, 242.3, 210/170, 220, 922, 923, 539, 540, 538, 776, 801

[56] References Cited

U.S. PATENT DOCUMENTS

| | | |
|---|---|---|
| 3,500,841 | 3/1970 | Logan . |
| 3,633,749 | 1/1972 | Panosh . |
| 3,700,109 | 10/1972 | Lasko . |
| 3,722,690 | 3/1973 | Stenstrom . |
| 3,727,765 | 4/1973 | Henning . |
| 3,782,553 | 1/1974 | Brekke . |

(List continued on next page.)

FOREIGN PATENT DOCUMENTS

| | | |
|---|---|---|
| 1242655 | 10/1988 | Canada . |
| 0328701 | 2/1988 | European Pat. Off. . |
| 2464335 | 4/1981 | France . |
| 2264011 | 8/1973 | Germany . |
| 2433660 | 2/1975 | Germany . |
| 2540647 | 3/1977 | Germany . |
| 402609 | 4/1974 | U.S.S.R. . |
| 703412 | 12/1979 | U.S.S.R. . |

OTHER PUBLICATIONS

Canadian Application 2,012,733, laid open Sep. 1990, Essop.
Canadian Application 2,021,968, laid open Jan. 1991, Ortega.
Canadian Application 2,035,585, laid open Aug. 1992, Todorski.
Canadian Application 2,053,326, laid open May, 1992, Ball.
Canadian Application 2,066,742, laid open Mar. 1991, Stephan.

*Primary Examiner*—Thomas M. Lithgow
*Attorney, Agent, or Firm*—Murray E. Thrift; Adrian D. Battison

[57] ABSTRACT

A mechanical device is used for separating oil films from the surface of water or for separating any two immiscible phases where the lighter phase forms a thin film on the top of the heavier phase. Both phases flow into the airlift scavenger outer vessel through a strainer which provides easier access to the lighter or oil phase due to larger orifices being located at the top of the strainer. After flowing into the vessel, both phases flow downwards to an expansion zone where the fluid velocities drop. This allows the large oil slugs to rise to the top of the outer vessel. The water phase, containing medium and small sized oil slugs, flows downwards to a baffle that turns the flow upwards. This causes the medium sized oil slugs to reverse their downward motion and rise to the top of the outer vessel to agglomerate at the top. This oil phase is continuously pumped to a storage vessel for recovery. The water phase containing small oil slugs continues downwards to the bottom of the outer vessel where it enters an inner vessel. Small air bubbles are blown into the bottom of the inner vessel through a sparger. These bubbles rise and cause the water/oil mixture also to flow upwards. This rising motion provides the energy necessary to pull the fluids through the strainer and down through the outer vessel. While rising, the small oil slugs are attracted to the air bubbles and attach to them. These oil slugs coalesce at the top and are transported (along with the water) through a smooth channel into a third separator vessel. The third vessel is the final separating vessel which permits the coalesced oil to rise to the top and so be continuously pumped to a storage vessel for recovery. The bottom water phase is now cleaned of oil and is allowed to flow back into the receiving waters.

9 Claims, 3 Drawing Sheets

Oil Film Scavenger

U.S. PATENT DOCUMENTS

| | | |
|---|---|---|
| 3,959,136 | 5/1976 | Ayers et al. . |
| 4,006,086 | 2/1977 | Tsunoi . |
| 4,033,875 | 7/1977 | Besik . |
| 4,100,072 | 7/1978 | Uchida . |
| 4,186,095 | 1/1980 | Walin . |
| 4,196,087 | 4/1980 | Gordon . |
| 4,251,361 | 2/1981 | Grimsley . |
| 4,332,519 | 6/1982 | Walin . |
| 4,440,523 | 4/1984 | Milgram . |
| 4,485,013 | 11/1984 | Cockman . |
| 4,597,863 | 7/1986 | Rymal . |
| 4,610,788 | 9/1986 | Ward . |
| 4,684,467 | 8/1987 | Cloud . |
| 4,761,225 | 8/1988 | Breslin . |
| 4,790,936 | 12/1988 | Renfrow . |
| 4,816,146 | 3/1989 | Schertler . |
| 4,818,399 | 4/1989 | Midkiff . |
| 4,865,725 | 9/1989 | Metais . |
| 5,035,795 | 7/1991 | Schmid . |
| 5,108,600 | 4/1992 | Rees et al. . |
| 5,122,280 | 6/1992 | Russell et al. . |
| 5,133,882 | 7/1992 | Stearns . |
| 5,154,835 | 10/1992 | DeMichael . |
| 5,160,605 | 11/1992 | Noestheden . |
| 5,173,185 | 12/1992 | Stokes . |

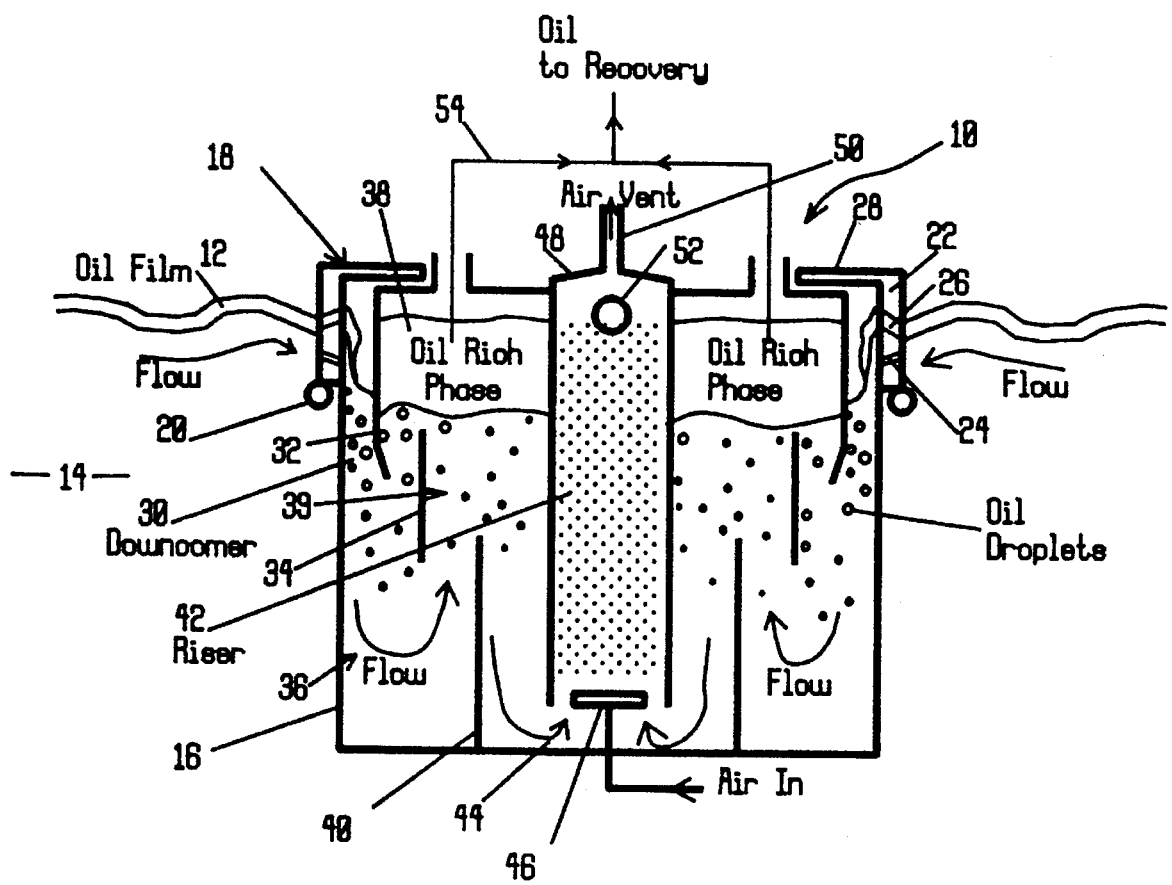
Figure 1. Oil Film Scavenger

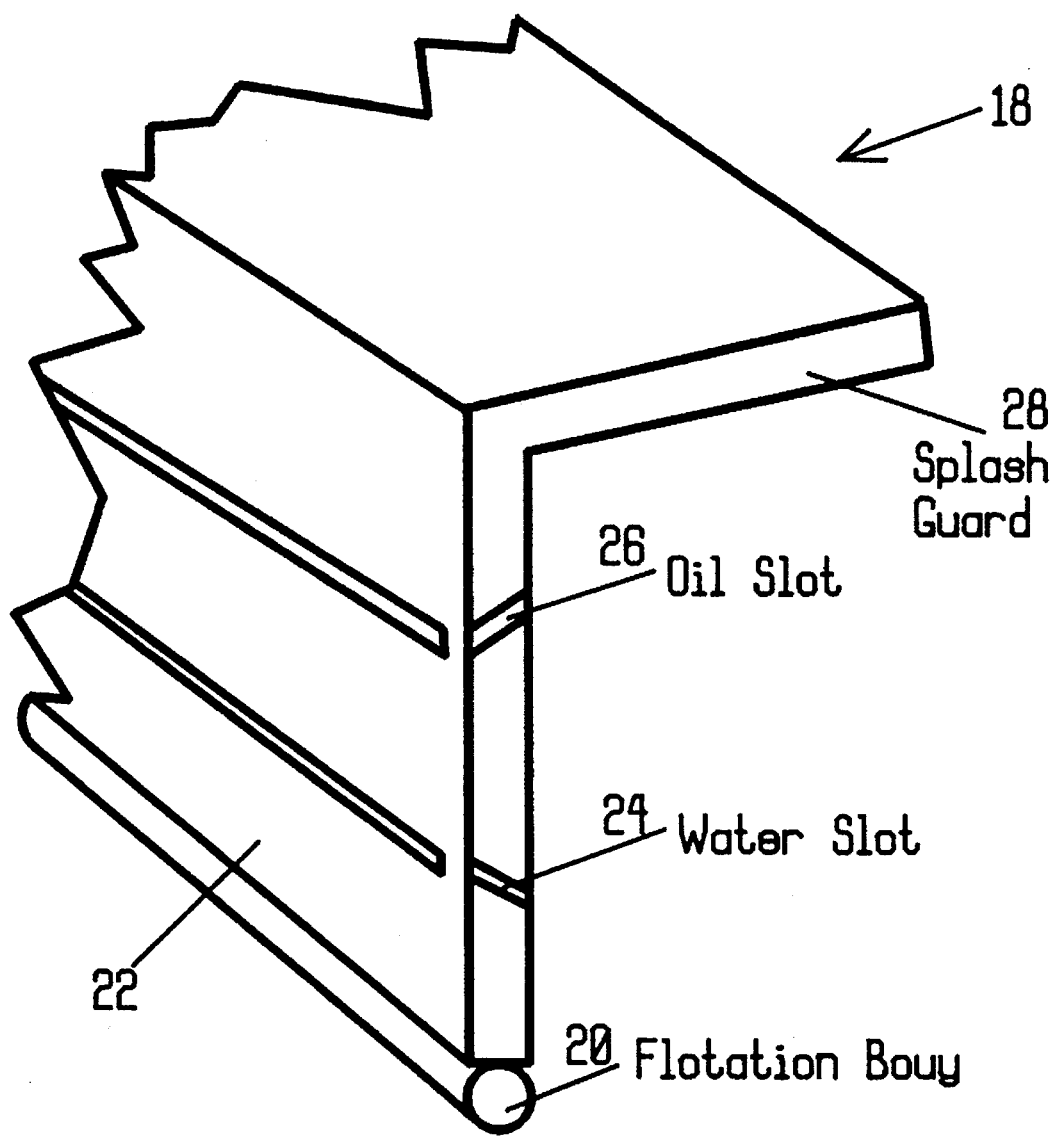
Figure 2. Strainer Mechanism

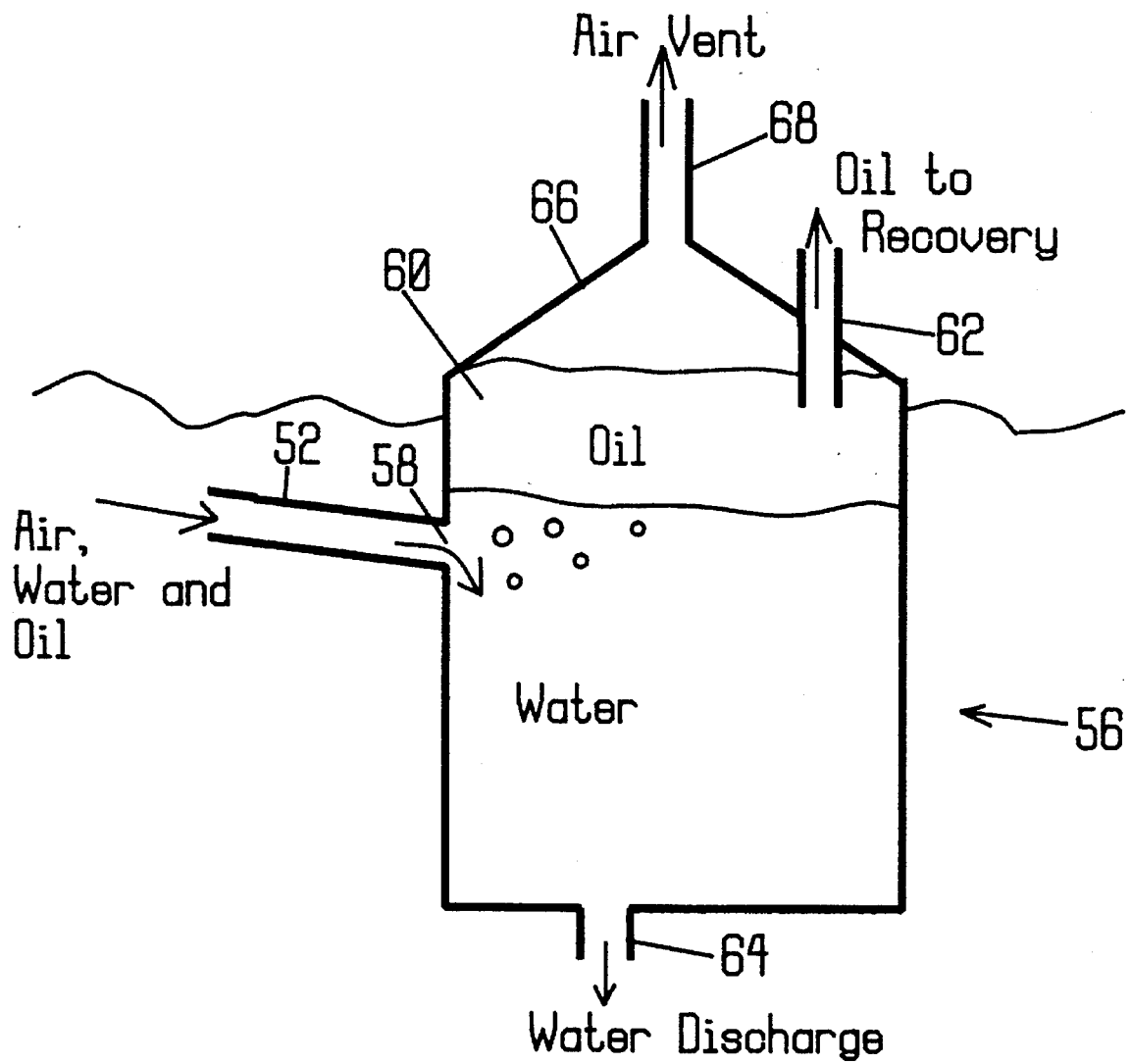
Figure 3. Emulsified Oil Separator

AIRLIFT OIL SCAVENGER

FIELD OF THE INVENTION

This invention relates to a device capable of efficiently separating a thin liquid film from the surface of another, denser liquid in which it is immiscible. The device is especially suited for separating an oil film from the surface of water.

BACKGROUND

Due to the increasing awareness of the potential for extensive damage to the environment from large spills of oil at sea, various mechanical devices have been proposed to separate oil film from the surfaces of bodies of water. Such mechanical devices could be adapted to separate any two immiscible liquids and for reasons other than environmental spills. Some of the devices disclosed in the patent literature are discussed in the following.

U.S. Pat. No. 3,742,662, issued to Ortiz, discloses an apparatus which locally confines an oil spill and collects it in a plastic bag. U.S. Pat. No. 3,788,079, issued to Kirk, describes covering an oil film with a sheet with a weighted periphery to drive the oil to the center. U.S. Pat. No. 3,800,951, issued to Moulon, and 4,038,182, issued to Jenkins, suggest recovering an oil film by swirling the surface of the water to create centrifugal forces which separate the oil from the water. U.S. Pat. No. 3,959,136, issued to Ayers and Hemphill, describes a mechanical skimmer with inclined baffles which is moved along or rotates at the surface of a body of water. U.S. Pat. No. 4,146,482, issued to Shyu, uses the force of waves to drive oil into a collecting panel and tube. U.S. Pat. No. 4,196,087, issued to Gordon, uses screws to draw oily film into a central separator tank. U.S. Pat. No. 4,356,086, issued to Oberg, pumps an oil film and water downward and allows the oil to rise up into a collecting chamber. U.S. Pat. No. 4,449,850, issued to Cessou, describes a device to cap an underwater source of leaking oil. U.S. Pat. No. 4,485,013, issued to Cockman, discusses the filtration of water through filtration cones while hydrocarbon phases cannot penetrate the filter orifices. U.S. Pat. No. 4,610,788, issued to Ward, relies on the proper flotation height of a downspout so that only soil is drawn into its entrance. U.S. Pat. No. 4,684,467, issued to Cloud, describes a clarification vessel where a pipe located at the top removes the lighter phase and a second pipe located at the bottom removes the heavier phase. Canadian patent 1,242,655, issued to Juurmaa and Kalaja, is an extension of the concept in U.S. Pat. No. 3,959,136. A special apparatus immerses ice chunks and thereby removes any oil stuck to their surfaces. U.S. Pat. No. 4,790,936, issued to Renfrow, discusses a floating balloon which acts as an oil clarification tank into which the oily water is pumped. The oil rises to the top. U.S. Pat. No. 4,816,146, issued to Schertler, describes a series of oil settling tanks stacked on top of one another with the oily water being pumped into the top tank and flowing downwards. U.S. Pat. No. 4,818,399, issued to Midkiff and Owensville, describes a floating storage vessel inside which oil is separated in a settling tank and then stored in more tanks within the vessel. Canadian patent 2,012,733, issued to Essop, describes a series of three tanks in which a lighter phase separates out of the first tank by gravity separation, the middle tank collects emulsions and the last tank simply holds and discharges the heavier phase (usually water). Canadian patent 2,021,968, issued to Ortega, describes the removal of an oil film through floating funnels which direct the incoming oil/water mixture to a series of three gravity separation tanks. Canadian patent 2,035,585, issued to Todorski, describes a gravity separation vessel consisting of interior baffles which divide the separator into gradually larger and larger spaces, thereby enhancing the gravitational separation of oil. Canadian patent 2,053,326, issued to Ball, describes a vessel which utilizes swirling flow and has numerous flow channels designed to allow gases and solids to separate from liquids by gravity. Canadian patent 2,066,742, issued to Stephan, describes a suction extractor which is said to be capable of sucking a lighter phase off the top of a heavier phase. U.S. Pat. No. 5,108,600, issued to Rees and Koblanski, describes a nozzle which can be used to suck an oil film from the top of water and to spray the oil jet to a receiving tank. U.S. Pat. No. 5,122,280, issued to Russell and Russell, discusses a continuous flow device which allows oil to build up inside a vertical tank and to be withdrawn intermittently by a pump. U.S. Pat. No. 5,133,882, issued to Stearns, describes a floating barge which incorporates six different techniques to separate oil including an underwater flotation system to retrieve entrained oil droplets. U.S. Pat. No. 5,173,185, issued to Stokes, describes a rotating drum which uses a vacuum and steel bristles to scrub oil off the top of water.

The current invention is significantly different from any of these previous devices. It combines two separation techniques into one oil-recovery system, as well as providing a unique method to pump large quantities of oily water into the separator.

SUMMARY

According to the present invention there is provided a scavenger for separating a first liquid from the surface of a body of a second liquid with which it is immiscible, said scavenger comprising:

a first container defining a first interior and having a bottom end;

means allowing the first and second liquids to enter the first container from adjacent the surface of the second liquid;

a second container defining a second interior and having a second container bottom end spaced below the first container inlet and second container inlet means adjacent the first and second container bottom ends and defining a flow communication pathway between the first and second interiors;

sparging means for injecting gas bubbles into the second container, adjacent the bottom thereof;

means for withdrawing liquid from the first container, above the bottom of the first container; and means for withdrawing liquid from the second container, above the bottom thereof.

The liquids entering the first container are subjected to a preliminary gravity separation. This may be enhanced using baffles that first direct the flow down to a first separating zone near the bottom of the first container and then direct the flow upwards to a second separating zone and finally downwards once more to the entrance to the second container. The gas injected into the second container rises as fine bubbles to the top of the second container and causes the liquids in that container to flow upwards. This rising motion draws the liquids through the apparatus. As the air bubbles rise to the top, small slugs of oil remaining in the liquid become attached to the air bubbles and are drawn upwards through the liquid column to coalesce at the top of the second container when the bubbles burst. These slugs and excess water are withdrawn from the top of the second container for subsequent separation. This subsequent separation is preferably done in a further container in which a gravity separation of the two liquids is carried out.

BRIEF DESCRIPTION OF THE DRAWINGS

In the accompanying drawings, which illustrate an exemplary embodiment of the present invention:

FIG. 1 is a schematic of the oil film scavenger;

FIG. 2 illustrates a strainer system with a splash plate; and

FIG. 3 is a schematic of a final separation tank

DETAILED DESCRIPTION

Referring to the accompanying drawings, and especially to FIG. 1, there is illustrated an oil film scavenger 10 for separating an oil film 12 from a body of water 14 on which it is floating. The scavenger includes an outer container 16 supported in the body of water, at the surface. Around the outer container is a strainer 18. This is independently supported on a flotation buoy 20 so as to remain at the surface of the body of water.

The strainer has a peripheral wall 22 surrounding the outer container. Relatively narrow water slots 24 are formed through the wall. These slope downwards to the inside and allow water to enter the top of the outer container. Above the water slots are larger, upwardly sloping oil slots 26. The larger size of the oil slots ensures that an adequate fraction of oil is drawn into the scavenger. At the top, the strainer has a horizontal splash guard that extends over the top of the outer container wall.

Oil and water entering the outer container enter a downcomer 30 defined between the side wall of the outer container and a baffle 32. The baffle 32 is positioned so that the liquid flux flowing downwards in the outer container is large enough to draw large oil droplets through the downcomer into the container. Inside the baffle 32 is a second baffle 34 that is positioned somewhat lower to cause liquid entering the outer container through the downcomer to travel downwards into a separating zone 36 where the liquid flow speed drops by a factor of about 10. This allows large slugs of oil to rise into the top of the outer container where they agglomerate as a thick oil layer 38, about one meter in depth in steady operation. Inside the baffle 34, the liquid is directed upwards to a second separating zone 39 by a further baffle 40. This causes oil slugs of a smaller size to reverse their downward motion so that they will rise to the top of the outer container and join oil layer 38. The remaining water and oil mixture is directed downwards around an inner container 42 fixed to the outer container until it reaches the bottom of the outer container and enters the inner container through openings 44 at the bottom.

At the bottom of the inner container above the openings 44 is a sparger 46. This is a porous disc that produces tiny bubbles, 1 to 2 mm in diameter when compressed air is pumped through it. In order to keep the small orifices in the sparger from plugging, the compressed air is humidified by passing it through a vessel containing water before it enters the sparger. The top end of the inner container or riser 42 has a conical cover 48 with a central air vent 50.

As the air bubbles rise in the riser 42, the small slugs of oil remaining in the water are attracted to and become attached to the air bubbles. At the surface of the riser, the bubbles burst and the oil is released to agglomerate with the other slugs being released at the top of the riser column. The oil, water and air slurry at the top of the riser is withdrawn through an outlet 52.

The thick layer of oil 38 is pumped from the outer container using oil recovery lines 54. The slurry in the outlet 52 is led to a separator vessel 56, illustrated in FIG. 3. The slurry enters this vessel through an inlet 58 below the liquid surface. The oil rises to the top due to agglomeration and gravity to form a thick oil layer 60. Once that layer is sufficiently thick, the oil is drawn through an oil withdrawal line 62 while water is discharged from the bottom of the tank through a water discharge 64. This tank has a conical cover 66 with a central air vent 68 to vent air entering with the oil and water slurry.

While one embodiment of the present invention has been described in the foregoing, it is to be understood that other embodiments are possible within the scope of the invention. Thus, for example, different versions of the strainer entrance may be used, although the sloping slots of the illustrated embodiment have been found to be particularly effective. It is also possible to use hydrophobic plugs in larger holes so that only organics could flow freely through them.

While not described in the foregoing, the apparatus may employ sensors to ensure that the oil that rises to the top in the outer container or in the separator is only pumped when a particular minimum depth is achieved, for example 1 or 2 meters.

While not described in the foregoing, the apparatus may employ a chemical injection system into the riser, such chemicals enhancing the attachment of the oil droplets to the bubbles.

It is therefore to be understood that the present invention is to be considered limited solely by the scope of the appended claims.

I claim:

1. A scavenger for separating a first liquid from the surface of a body of a second liquid, the first liquid being less dense than and immiscible with the second liquid, said scavenger comprising:

a first container defining a first container interior and having a bottom end;

first container inlet means in the first container allowing the first and second liquids to enter the first container from adjacent the surface of the second liquid;

a second container defining a second interior and having a second container bottom end spaced flow the first container inlet and second container inlet means adjacent the first and second container bottom ends and defining a flow communication pathway between the first and second interiors;

sparging means for injecting gas bubbles into the second container above the second container inlet means;

means for withdrawing said first liquid from the first container; and means for withdrawing said second liquid from the second container.

2. A scavenger according to claim 1 including first baffle means in the first container for causing liquids entering the first container to flow in a downwards direction to a first separating zone.

3. A scavenger according to claim 2 including second baffle means in the first container for causing liquids to flow in an upwards direction from the first separating zone to a second separating zone.

4. A scavenger according to claim 3 wherein said second container comprises a third baffle means for causing liquid from the second separating zone to flow downwards to the second container inlet means.

5. A scavenger according to claim 4 wherein the second container is within the first container.

6. A scavenger according to claim 1 wherein the first container is supported in the body of second liquid, adjacent the surface thereof.

7. A scavenger according to claim 6 wherein the means allowing the first and second liquids to enter the first container comprise a strainer.

8. A scavenger according to claim 7 wherein the strainer comprises a plurality of liquid-passing apertures, including first apertures for passing the first liquid and smaller second apertures located at a lower level for passing the second liquid.

9. A scavenger according to claim 1 including a third container for receiving the liquid withdrawn from the second container, means for withdrawing first liquid from adjacent the top of the third container and means for discharging second liquid from adjacent the bottom of the third container.

* * * * *